United States Patent [19]

Van Deursen

[11] 4,397,526

[45] Aug. 9, 1983

[54] FOLDABLE MIRROR

[75] Inventor: Gary E. Van Deursen, Upper Saddle River, N.J.

[73] Assignee: General Electric Company, New York, N.Y.

[21] Appl. No.: 280,825

[22] Filed: Jul. 6, 1981

[51] Int. Cl.³ .............................................. G02B 5/10
[52] U.S. Cl. ..................................... 350/310; 248/472
[58] Field of Search ...................... 350/288, 306, 310; 248/472

[56] References Cited

U.S. PATENT DOCUMENTS

| | | | |
|---|---|---|---|
| 1,957,847 | 5/1934 | Peters | 350/306 X |
| 2,389,788 | 11/1945 | Lathrop | 132/79 |
| 3,256,892 | 6/1966 | Esposito, Jr. | 132/83 |
| 4,146,308 | 3/1979 | Cohen | 350/306 |
| 4,232,075 | 11/1980 | Gantz et al. | 350/306 |

FOREIGN PATENT DOCUMENTS 680859  10/1966  Belgium ............................. 350/288

*Primary Examiner*—F. L. Evans
*Attorney, Agent, or Firm*—John F. Cullen; George R. Powers; Leonard J. Platt

[57] ABSTRACT

A foldable mirror has a peripheral two-piece frame with an offset supporting leg and a pair of oppositely disposed hinges connecting the pieces together. The frame includes stacked channels forming an E in cross-section with the hinges at the center end of the E so the frame folds book-like to form a compact small structure. When folded, the stacked channels form a single enclosed large channel that preferably extends completely across the frame. A non-glass single flexible sheet of reflecting mirror material is secured in the frame between the hinges with the hinges centerline in the same plane as the reflective surface. The arrangement is such that, on folding, the mirror forms a tear drop fold disposed and protected in the large channel across the back of the mirror to prevent permanent mirror distortion.

8 Claims, 3 Drawing Figures

FOLDABLE MIRROR

BACKGROUND OF THE INVENTION

1. Field of the Invention

The invention is directed to a foldable mirror of a two piece peripheral frame with hinges and a non-glass single flexible sheet reflecting mirror material supported in the frame such that the frame folds upon itself and the flexible sheet forms a tear-drop fold falling into and protected by a channel so the mirror closes into a compact small structure without permanent mirror distortion and opens into a larger distortion-free mirror.

2. Description of the Prior Art

Various foldable mirrors or make-up cases comprising articulated parts in various forms exist to provide support for one or more mirrors both in large dresser-type sizes and small compact sizes for purses. Generally, these comprise articulated hinged parts containing glass or sometimes metallic mirrors supported on a stiff backing. Additionally, various non-glass reflective mirrors have been proposed but are subject to distortion and do not easily fold into compact configurations.

SUMMARY OF THE INVENTION

Briefly described, the invention is directed to a foldable mirror of any suitable size which comprises a generally peripheral two-piece frame with a pair of hinges connecting the pieces together in the frame including stacked channels forming an E in cross-section with the hinges in the center end of the E and at the periphery of the frame so the frame folds book-like on itself and the stacked channels rotate into a single enclosed large channel. A non-glass single flexible sheet of reflecting mirror such as a metal film has its back surface secured in the frame between the hinges and is supported by back-up panels extending across the frame and spaced so the flexible sheet bends with a tear-drop fold falling in the protected single channel in the space between the back-up sheets. As the mirror is opened to "use" position, the centerline of the hinges falls substantially in the same plane as the reflective surface and stretches the mirror into a flat distortion-free surface. Thus, the main object of the invention is to disclose a foldable mirror using a single non-glass reflecting sheet supported to be safely folded into a compact box-like smaller structure or opened into a flat distortion-free mirror.

DESCRIPTION OF THE PREFERRED EMBODIMENT

Figure 1:
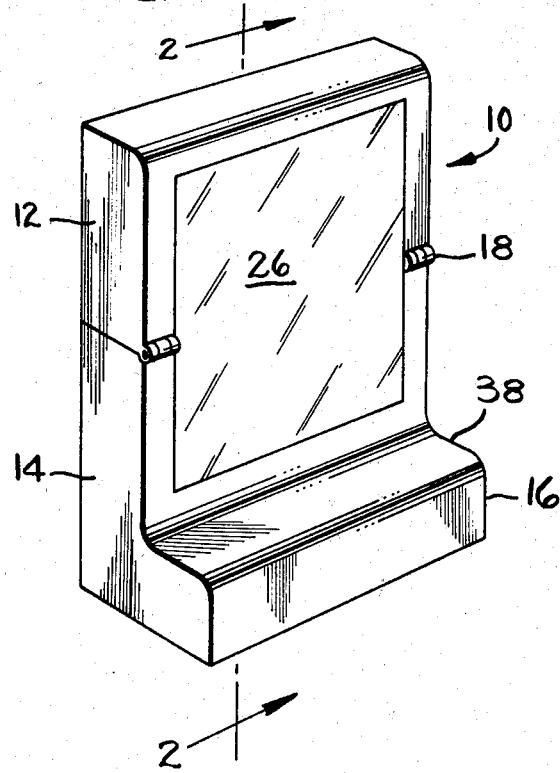
FIG. 1 is a perspective typical mirror opened to "use" position.

Referring to FIG. 1, the general mirror comprises a peripheral frame 10 of any suitable shape such as circular or square type shown and formed generally in an upper piece 12 and a similar lower piece 14 generally symmetrical although the lower piece may be formed to have an offset supporting leg 16. For folding, the front edge includes a pair of hinges 18 oppositely disposed to one another and connecting the frame pieces 12 and 14 together with the hinges being arranged so the upper piece 12 folds forward and down as shown in FIG. 2 into a compact smaller nested position shown in FIG. 3.

Figure 2:
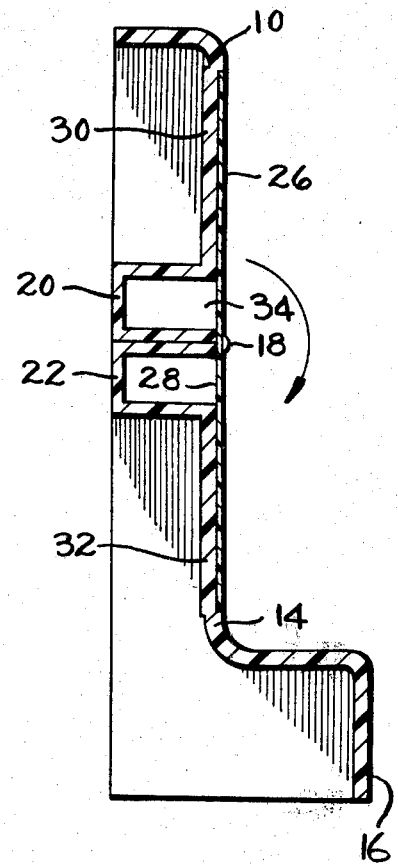
FIG. 2 is a cross-section on line 2—2 of FIG. 1.
Figure 3:
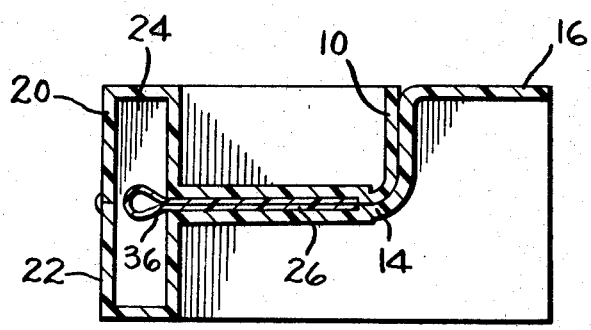
FIG. 3 is a cross-section of the folded mirror in the direction of the arrow on FIG. 2.

For a purpose to be explained, the frame includes a pair of horizontal stacked channels such as upper channel 20 and lower channel 22 that form an E in cross-section as shown in FIG. 2 with hinges 18 disposed at the center end of the E and at the periphery or sides of the frame so frame pieces 12 and 14 fold book-like onto each other or from the position of FIG. 2 to that of FIG. 3. When in folded position, the stacked channels 20 and 22 when rotated form a single enclosed large channel 24 as seen in FIG. 3. Any general arrangement of frame may be used for aesthetic purposes and the description merely indicates the operation. For example, the entire frame may be closed on the back side, may take numerous configurations such as round, oval, or rectangular with suitable latching means to hold the frame in the closed compact position of FIG. 3 providing the general structural arrangement described is used. In order to provide a reflecting surface, a non-glass single flexible sheet of reflecting material forms a flat mirror 26. This mirror may be any suitable known flexible highly reflective material such as vacuum metalized Mylar plastic film or polycarbonate sheet or other plastics of metal film. The back surface 28 of the mirror is secured by suitable means in the frame between the hinges. Such fastenings cause the mirror to form a flat stretched sheet when opened to the "use" position of FIG. 1. To provide solid support, the frame channels may extend completely across the back of the mirror and the frame may include spaced back-up panels 30 and 32 that may be separate or integrally formed as part of the molded frame. The panels are rigid and thus secured to the frame with each extending adjacent its channel across the frame behind and supporting the sheet mirror 26 as seen in FIG. 2. This arrangement provides a space 34 between the upper panel 30 and lower panel 32 which space straddles the fold line of the sheet when it is in folded position as shown in FIG. 3.

Since the non-glass flexible sheet must be folded to assume the position in FIG. 3, the mirror must not have a fold line that will create distortion when in open position of FIG. 1. To this end, the flexible sheet generally when folded is allowed by the space 34 between the back up panels to assume a tear-drop shape 36 of a general diameter that depends on the thickness of the flexible sheet and material used. With the spaced panels and the folding of adjacent channels 20 and 22 into a larger single channel 24, the tear drop fold is disposed completely in and protected by the large channel to prevent any permanent mirror distortion against flattening the fold line. Thus, the space 34 between the panels is larger than the diameter of the tear drop fold as shown in FIG. 3 and completely encloses and protects the fold in the mirror.

In order for the mirror to assume an open undistorted flat surface, the centerline of the hinges falls substantially in the same plane as the reflective surface as clearly seen in FIG. 2. Thus, when the mirror is opened some slight stretching or tautness occurs to provide a substantially distortion-free reflecting surface.

The structure described may include a completely integral molded pair of upper and lower pieces with their channels integrally formed so that essentially a two-piece peripheral framework is provided. For a compact box-like smaller folded structure, the offset 38 of lower leg 16 may be the same thickness as the frame so that, when nested together as shown in FIG. 3, a compact structure about half the open size is provided.

The usual lights, clasps, vanity trays, and carrying handle may be supplied to the general combination configuration shown and described such that a compact folded mirror of substantially any practical size is provided in a non-glass reflector using a single plastic distortion-free permanent mirror.

While I have hereinbefore described a preferred form of the invention, obvious equivalent variations are possible in light of the above teachings. It is therefore to be understood that, within the scope of the appended claims, the invention may be practiced otherwise than as specifically described, and the claims are intended to cover such equivalent variations.

I claim:

1. A foldable mirror comprising,
    a peripheral two-piece frame,
    a pair of oppositely disposed hinges connecting said pieces,
    said frame including a pair of stacked channels forming an E in cross section with said hinges disposed at the center end of the E at the periphery so the frame pieces fold booklike on each other with the stacked channels forming a single enclosed large channel,
    a non-glass single flexible sheet of reflecting mirror material with its back surface secured in the frame between said hinges,
    said hinges centerline falling substantially in the same plane as the reflective surface,
    whereby on folding the frame upon itself the mirror forms a tear drop fold disposed and protected in said large channel to prevent permanent mirror distortion.

2. Apparatus as described in claim 1 wherein one frame piece has an offset supporting leg,
    the other piece hinged to rotate into nesting position against said leg.

3. Apparatus as described in claim 2 wherein said offset is substantially the thickness of said frame,
    said other piece folded to nest therein forming a compact box-like smaller structure.

4. Apparatus as described in claim 3 wherein said channels extend across the back of said sheet and includes both hinges.

5. Apparatus as described in claim 4 having,
    a pair of spaced rigid back-up panels secured to said frame and each extending adjacent a channel and across the frame behind and supporting said sheet,
    the space between said panels straddling the tear drop fold line of said sheet in folded position.

6. Apparatus as described in claim 5 wherein the space between panels is larger than the diameter of the tear drop sheet fold.

7. Apparatus as described in claim 6 wherein each said panel and adjacent channel is an integral molded piece.

8. Apparatus as described in claim 7 wherein said sheet is a plastic of reflective metal film forming said mirror.

* * * * *